United States Patent
Imm et al.

(10) Patent No.: US 9,900,936 B2
(45) Date of Patent: Feb. 20, 2018

(54) OVER-THE-RANGE MICROWAVE OVEN AND METHOD OF USING THE SAME

(71) Applicant: Dongbu Daewoo Electronics Corporation, Seoul (KR)

(72) Inventors: Jun Hyuk Imm, Seoul (KR); Jong Jin Lee, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 205 days.

(21) Appl. No.: 14/597,162

(22) Filed: Jan. 14, 2015

(65) Prior Publication Data

US 2016/0165676 A1    Jun. 9, 2016

(30) Foreign Application Priority Data

Dec. 5, 2014  (KR) .................. 10-2014-0174469

(51) Int. Cl.
*H05B 6/64* (2006.01)
*F24C 15/20* (2006.01)
(Continued)

(52) U.S. Cl.
CPC ............. *H05B 6/6473* (2013.01); *A23L 5/15* (2016.08); *A47J 37/0641* (2013.01); *F24C 15/2007* (2013.01); *H05B 6/6408* (2013.01); *H05B 6/6423* (2013.01); *H05B 6/6482* (2013.01); *A23V 2002/00* (2013.01)

(58) Field of Classification Search
CPC ..... A23L 5/15; F24C 15/2007; H05B 6/6482; H05B 6/6423; H05B 6/6473; H05B 6/6408; A23V 2002/00

USPC ....... 219/757, 680, 681, 682, 400, 679, 685, 219/725, 728, 732, 746, 749, 751, 756;
(Continued)

(56) References Cited

U.S. PATENT DOCUMENTS 4,508,947 A * 4/1985 Eke ...................... H05B 6/6411
126/21 A
4,591,683 A * 5/1986 Eke ...................... H05B 6/6411
126/21 A
(Continued)

FOREIGN PATENT DOCUMENTS

GB         2123660 A       2/1984
JP         H06-196258      7/1994
(Continued)

OTHER PUBLICATIONS

Korean Intellectual Property Office; Office Action issued in counterpart Korean Application No. 10-2014-0174469; dated Nov. 17, 2015; Korea.

*Primary Examiner* — Quang Van

(57) ABSTRACT

An over-the-range microwave oven includes: a housing; an electric equipment chamber which is disposed in the housing, and includes a control panel, and a drive unit; a cooking chamber which is disposed in the housing and controlled by the electric equipment chamber, and has an air inlet portion which is disposed at one side of the cooking chamber and into which outside air flows, and an opening and closing unit which is disposed at the other side of the cooking chamber and that is opened and closed based on a flow rate of flowing air; and a duct unit in the housing and disposed outside the cooking unit.

14 Claims, 6 Drawing Sheets

(51) Int. Cl.
 *A23L 5/10* (2016.01)
 *A47J 37/06* (2006.01)
(58) Field of Classification Search
 USPC .............. 126/21 A, 299 R, 273 R, 198, 243;
 99/330; 426/243; 118/119
 See application file for complete search history.

(56) References Cited

U.S. PATENT DOCUMENTS

| | | | | |
|---|---|---|---|---|
| 4,771,154 | A | * | 9/1988 | Bell ..................... F24C 7/06 219/399 |
| 4,927,991 | A | * | 5/1990 | Wendt ................ B65D 81/3446 219/728 |
| 5,002,796 | A | * | 3/1991 | Nishida ................ C23C 16/407 118/119 |
| 5,676,871 | A | * | 10/1997 | Graves ..................... H05B 6/64 219/222 |
| 2003/0189042 | A1 | * | 10/2003 | Zhang ................ B65D 81/3453 219/728 |
| 2006/0003686 | A1 | | 1/2006 | Yamauchi |
| 2008/0156313 | A1 | | 7/2008 | Sohn et al. |
| 2014/0322417 | A1 | * | 10/2014 | Kim ..................... F24C 15/322 426/523 |

FOREIGN PATENT DOCUMENTS

| | | |
|---|---|---|
| KR | 20-0138671 | 3/1999 |
| KR | 10-0577229 | 5/2006 |
| KR | 10-0760181 | 9/2007 |
| KR | 10-2014-0030023 | 3/2014 |

\* cited by examiner

OVER-THE-RANGE MICROWAVE OVEN AND METHOD OF USING THE SAME

CROSS-REFERENCE TO RELATED APPLICATION

This application claims benefit of and priority to Korean Patent Application No. 10-2014-0174469, filed on Dec. 5, 2014, with the Korean Intellectual Property Office, the disclosure of which is incorporated herein in its entirety by reference.

TECHNICAL FIELD

Embodiments according to the present disclosure relate to an over-the-range microwave oven which additionally functions as an air fryer, and a method of using the over-the-range microwave oven.

BACKGROUND

In general, an over-the-range microwave oven refers to a microwave oven that discharges air. The over-the-range microwave oven is spaced apart from an upper side of a gas range in order to implement the aforementioned function.

That is, a typical over-the-range microwave oven may include a cooking unit and a duct unit. The cooking unit heats substances such as food or liquid (hereinafter, referred to simply as food) using microwave energy.

However, the over-the-range microwave oven just warms up or heats food using microwave energy, but has a limitation when cooking food.

Therefore, an over-the-range microwave oven that may be utilized for the purpose of making a variety of dishes would be valuable.

SUMMARY

Embodiments according to the present disclosure provide an over-the-range microwave oven which performs a frying function in addition to a function of a general microwave oven, thereby improving the over-the-range microwave oven.

An example embodiment according to the present disclosure provides an over-the-range microwave oven including: a housing which defines its external appearance; an electric equipment chamber which is disposed in the housing, and includes a control panel and a drive unit; a cooking chamber which is disposed in the housing and controlled by the electric equipment chamber, and has an air inlet portion which is disposed at one side of the cooking chamber and into which outside air flows, and an opening and closing unit which is disposed at the other side of the cooking chamber and that is opened and closed based on a flow rate of flowing air; and a duct unit which is accommodated in the housing and disposed outside the cooking unit.

In an embodiment, the opening and closing unit may include a discharge hole which is formed in a wall at the other side of the cooking chamber, and an opening and closing plate which is hingedly coupled outside the wall at the other side of the cooking chamber.

In an embodiment, the opening and closing plate may be disposed above the discharge hole and close the discharge hole using its own weight.

In an embodiment, the opening and closing plate may be disposed at a lateral side of the discharge hole, and a flat spring may be disposed at a position where the opening and closing plate is hingedly coupled, such that the discharge hole may be closed by the restoring force of the flat spring.

In an embodiment, a motor may be disposed at a position where the opening and closing plate is hingedly coupled, such that the opening and closing plate may open and close the discharge hole by operation of the motor.

In addition, the over-the-range microwave oven may further include a heater unit which is disposed in the electric equipment chamber or in the cooking chamber.

In addition, the heater unit may include an electric heater which is disposed in the electric equipment chamber to correspond to the air inlet portion, and a fan which is disposed at the rear of the electric heater and allows air heated by the electric heater to flow to the air inlet portion.

In addition, the heater unit may include a halogen lamp which is disposed on either an upper surface or a lateral side surface of the cooking chamber.

In an embodiment, two or more halogen lamps may be disposed on the upper surface of the cooking chamber and spaced apart from each other at predetermined intervals.

In an embodiment, two or more halogen lamps may be disposed on one side surface or both lateral side surfaces of the cooking chamber and spaced apart from each other at predetermined intervals.

In addition, the over-the-range microwave oven may further include a convection plate which is disposed on a food accommodating portion at the bottom of the cooking chamber and which allows hot air flowing from the air inlet portion to flow upward.

In addition, the convection plate may include: a supporting portion which is supported on the bottom of the cooking chamber; a concave portion which is supported by the supporting portion and is open facing upward; and a convection portion which is disposed on the concave portion to support food and that allows air flowing into the concave portion to flow upward clockwise or counterclockwise.

In addition, a reflective plate may be disposed on an upper surface of the concave portion which faces the convection portion.

In addition, the reflective plate may be formed as a ceramic coated layer.

In addition, the convection portion may include a plurality of circular and concentric supporting ribs which have diameters that increase in the direction away from its center, and a plurality of cross ribs which each have one end connected to the center and the other end connected to the outermost supporting rib, and are coupled to the plurality of supporting ribs where they intersect the plurality of supporting ribs.

In addition, the plurality of cross ribs each may curve in the same direction, and may be disposed at equal intervals from one another.

Another example embodiment of the present disclosure provides a method of using an over-the-range microwave oven, which functions as an air fryer, the method including: placing food in a cooking chamber; and selecting an air fryer option using a control panel.

In addition, in placing the food, a convection plate may be disposed in the cooking chamber, and the food may be placed on the convection plate.

In addition, the selecting of the air fryer option may further include setting a cooking time.

The present disclosure provides an over-the-range microwave oven which includes an opening and closing unit which is disposed at one side of the cooking chamber and is opened and closed based on a flow rate of air, and also includes a heater unit, and thereby functions as an air fryer which may directly fry food in addition to functioning as a typical microwave oven.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
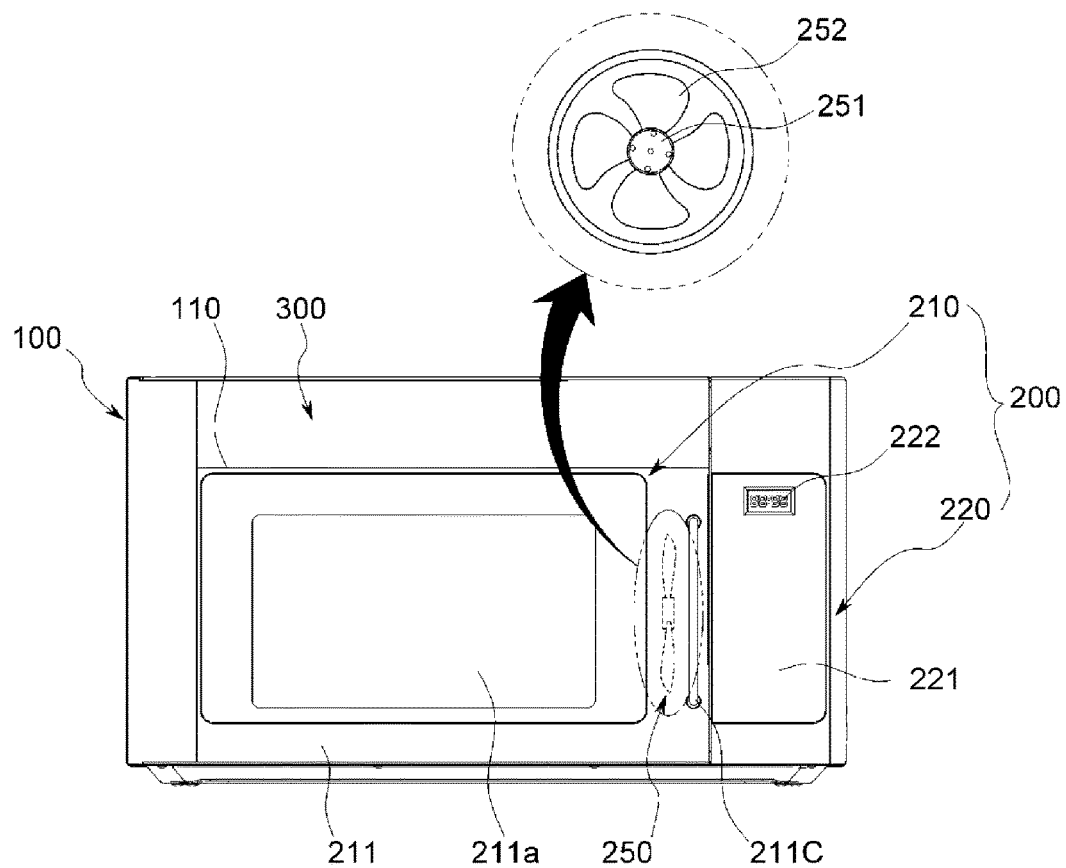
FIG. 1 is a front view of an over-the-range microwave oven, which functions as an air fryer, in an example embodiment according to the present disclosure.

In the following detailed description, reference is made to the accompanying drawings. The illustrative embodiments described in the detailed description, drawings, and claims are not meant to be limiting. Other embodiments may be utilized, and other changes may be made, without departing from the spirit or scope of the subject matter presented here.

Hereinafter, an example embodiment according to the present disclosure will be described in detail with reference to the accompanying drawings.

Unless particularly defined otherwise, terms used in the present specification have the same general meanings as they would be understood by those skilled in the art, and if the terms used in the present specification conflict with the general meanings of those terms, thenthe meanings of the terms comply with the meanings defined in the present specification.

The present disclosure, which is disclosed below, is merely intended to describe the example embodiments according to the present disclosure, but is not intended to limit the scope of the present disclosure. Like reference numerals designate like elements throughout the specification.

Figure 2:
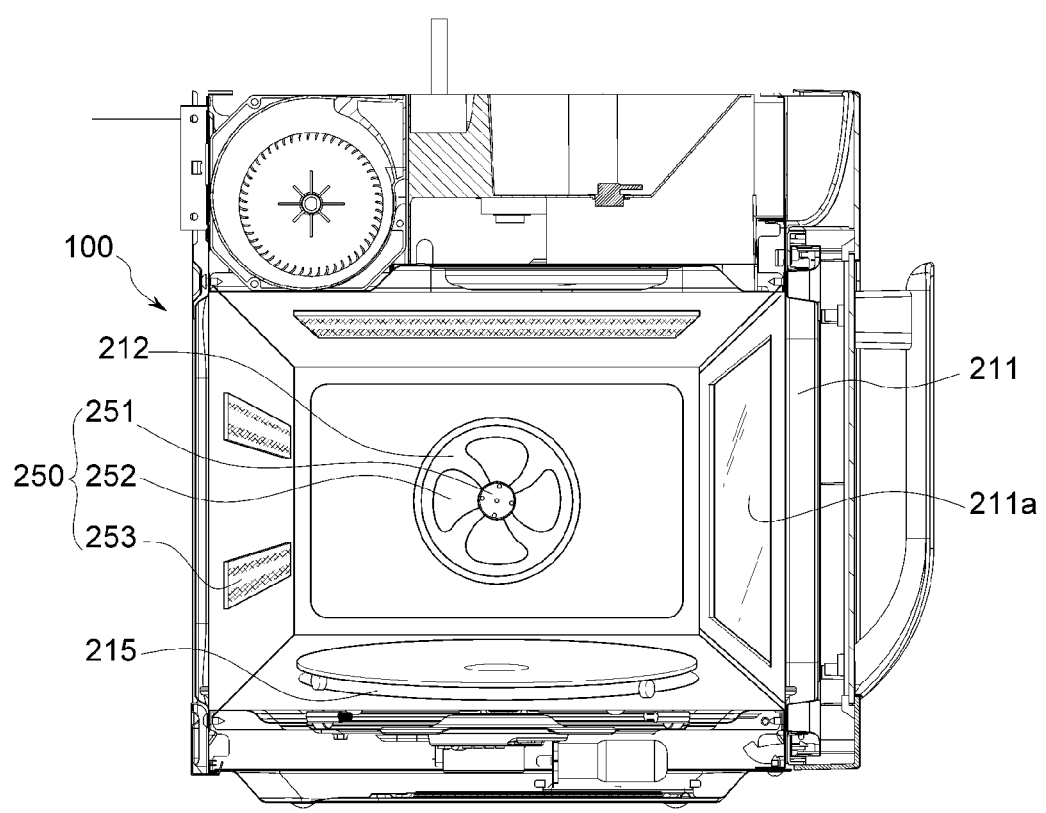
FIG. 2 is a side view illustrating the interior of a cooking chamber in an example embodiment according to the present disclosure.
Figure 3A:
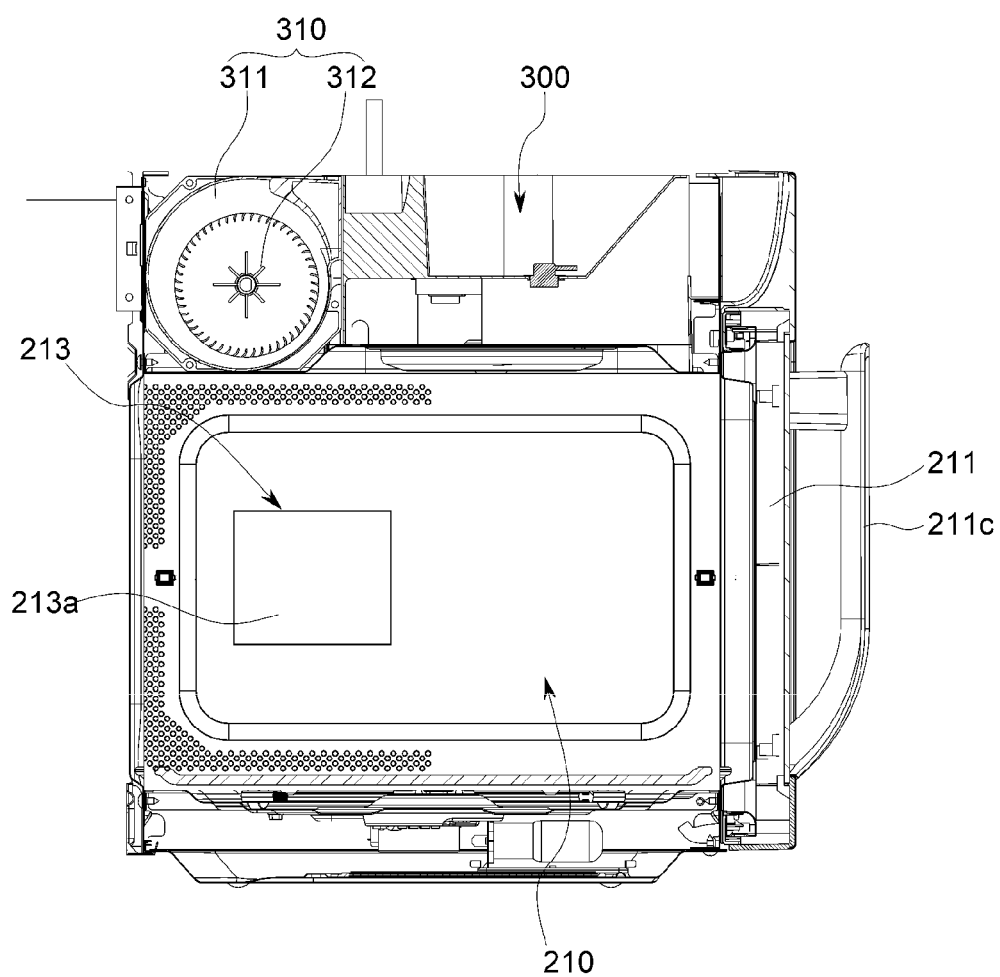
FIG. 3A is a view illustrating a state in which an opening and closing unit is closed in an example embodiment according to the present disclosure.
Figure 3B:
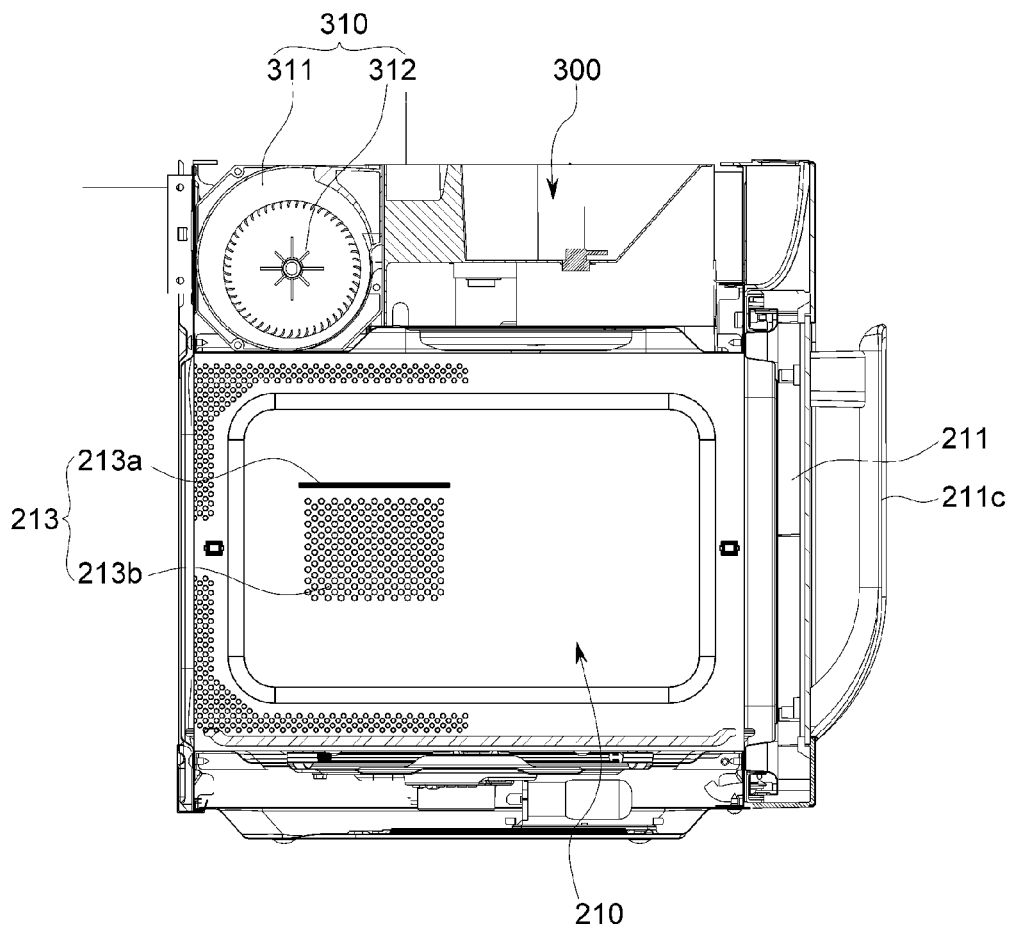
FIG. 3B is a view illustrating a state in which the opening and closing unit is opened in an example embodiment according to the present disclosure.

FIG. 1 is a front view of an over-the-range microwave oven, which functions as an air fryer, in an example embodiment according to the present disclosure, FIG. 2 is a side view illustrating the interior of a cooking chamber in an example embodiment according to the present disclosure, FIG. 3A is a view illustrating a state in which an opening and closing unit is closed in an example embodiment according to the present disclosure, and FIG. 3B is a view illustrating a state in which the opening and closing unit is opened in an example embodiment according to the present disclosure.

Referring to FIG. 1 to FIG. 3B, an over-the-range microwave oven according to an exemplary embodiment of the present disclosure may include a housing 100, a cooking unit 200, and a duct unit 300.

The housing 100 defines the external appearance of the over-the-range microwave oven, and may be made of a metallic material or a nonmetallic material. The housing 100 may be formed in a hexahedron shape, but the present disclosure is not so limited.

In addition, the housing 100 may further include a partition housing 110 which may partition the interior of the housing 100 into a cooking unit 200 and a duct unit 300, which will be described below. The partition housing 110 may be formed integrally with the housing 100, or it may be fastened to the housing 100 by bolts, for example.

In an embodiment, the partition housing 110 may have a water vapor discharge portion through which water vapor flows out of a cooking chamber 210 of the cooking unit 200 when food is cooked in the cooking chamber 210, and may have a light entering portion through which light from a lighting unit (not illustrated) enters the cooking chamber 210.

In addition, the housing 100 may be formed as an outer wall of the duct unit 300 which will be described below.

The cooking unit 200 is disposed in the housing 100, and may include an electric equipment chamber 220 which is disposed at one side of the cooking chamber 210 and includes a control panel 221 and a drive unit (not illustrated).

Although not illustrated, the control panel 221 may include buttons, a touch panel, or a dial to allow a user to control the cooking chamber 210 which will be described below, and may include a display unit 222 to allow the user to view and confirm various types of information about the over-the-range microwave oven according to the example embodiment.

In addition, the control panel 221 may include buttons, a touch panel, or a dial so as to allow the user to operate the duct unit 300 which will be described below, and which also may control a cooking environment in the cooking chamber 210 based on a state of the interior of the cooking unit 200 which is sensed by a humidity sensor (not shown).

The drive unit (not illustrated) may include a magnetron which generates microwaves, a waveguide which guides the generated microwaves into the cooking chamber, and a high voltage transformer which applies a high voltage to the magnetron.

In addition, the drive unit in the example embodiment may include a heater unit 250, and specifically, may include an electric heater 251 which is disposed in the electric equipment chamber 220 at a position that corresponds to the position of an air inlet portion 212 in the cooking chamber 210 which will be described below, and a fan 252 which is disposed at the rear of the heater and allows air heated by the heater to flow to the air inlet portion 212.

A door 211 may be disposed in the front of the cooking chamber 210. The door 211 may be hingedly coupled to the housing 100 so as to be closed and opened at one side, and a handle 211c may be disposed on the door 211 to allow the user to easily open and close the door 211. In addition, in order to allow the user to easily observe the interior of the cooking chamber 210, the door 211 may further include a transparent window 211a made of tempered glass in the door 211.

The cooking chamber 210 is controlled by the electric equipment chamber 220. The air inlet portion 212 into which outside air flows may be provided at one side of the cooking chamber 210, and an opening and closing unit 213, which is opened and closed based on a flow rate of flowing air, may be provided at the other side of the cooking chamber 210.

Specifically, referring to FIGS. 3A and 3B, the opening and closing unit 213 may include a discharge hole 213b which is formed in a wall at the other side of the cooking chamber 210, and an opening and closing plate 213a which is hingedly coupled outside the wall at the other side of the cooking chamber 210.

Here, the discharge holes 213b may be formed as a plurality of holes, and may be formed concentratedly at one location as illustrated, but the present disclosure is not so limited. Alternatively, a single discharge hole 213b may be formed in a side wall of the cooking chamber 210, or a plurality of discharge holes 213b may be formed in the side wall of the cooking chamber 210 but are spaced apart from each other.

The opening and closing plate 213a may be disposed above the discharge holes 213b so as to close the discharge holes 213b using its own weight, may have a thin plate shape, and may be made of a metallic material or thermoset plastic so that it is not deformed by hot air.

Because a flow rate of hot air is higher when the over-the-range microwave oven according to the example embodiment functions as an air fryer than when the over-the-range microwave oven functions as a general microwave oven, the opening and closing plate 213a automatically adjusts the amount at which the discharge holes 213b are opened based on the flow rate of hot air, thereby maintaining or adjusting conditions in the cooking chamber 210.

Alternatively, the opening and closing plate 213a is disposed at a lateral side of the discharge holes 213b, and a flat spring (not illustrated) is disposed at a position where the opening and closing plate 213a is hingedly coupled, such that the discharge holes 213b may be closed by the restoring force of the flat spring. The restoring force of the flat spring may be set to be equal to or less than than the force exerted by a predetermined flow rate of air or a predetermined pressure.

In addition, the opening and closing plate may be disposed at a lateral side of the discharge holes, and a flat spring may be disposed at a position where the opening and closing plate is hingedly coupled, such that the discharge holes may be closed by the restoring force of the flat spring.

The example embodiment includes an air fryer function that uses a gas (e.g., air) flow in order to cook or warm up food.

In order to effectively implement the air fryer function, the example embodiment according to the present disclosure may further include the heater unit 250 which is disposed in the electric equipment chamber 220 or the cooking chamber 210. The heater unit 250 serves to allow air to flow directly to food in order to improve the efficiency of heat transfer at the surface of the food using an air flow in which air molecules overlap and collide with each other.

In the example embodiment, in order to further heat the food in an air fryer mode, microwave energy, which is used when the over-the-range microwave oven functions as a general microwave oven, or other heating means may be used together with the heater unit.

The heater unit 250 according to the example embodiment may include the electric heater 251, which is disposed in the electric equipment chamber 220 so as to correspond to the air inlet portion 212, and the fan 252, which is disposed at the rear of the heater 251 and allows air heated by the heater 251 to flow to the air inlet portion 212.

In addition, the heater unit 250 may include a halogen lamp 253 which is disposed on either the upper surface or a lateral side surface of the cooking chamber 210. In an embodiment, two or more halogen lamps 253 may be disposed on the upper surface of the cooking chamber 210 and spaced apart from each other at predetermined intervals, or two or more halogen lamps 253 may be disposed on one lateral side surface or both lateral side surfaces of the cooking chamber 210, spaced apart from each other at predetermined intervals.

The duct unit 300 is accommodated in the housing 100, and may form a flow path between the housing 100 and the cooking unit 200. The duct unit 300 may include an air discharge unit 310. The air discharge unit 310 may include an air discharge motor 311 and an impeller 312 which is operated by the air discharge motor 311 and allows air to flow.

In the example embodiment, the over-the-range microwave oven may effectively fry or cook food and/or food ingredients using the opening and closing unit 213, the heater unit 250, and/or the magnetron.

In order to further improve the aforementioned technical features, the example embodiment may further include a convection plate 260 which is disposed on a food accommodating portion at the bottom of the cooking chamber 210 and that allows hot air flowing from the air inlet portion 212 to flow upward.

Figure 4:
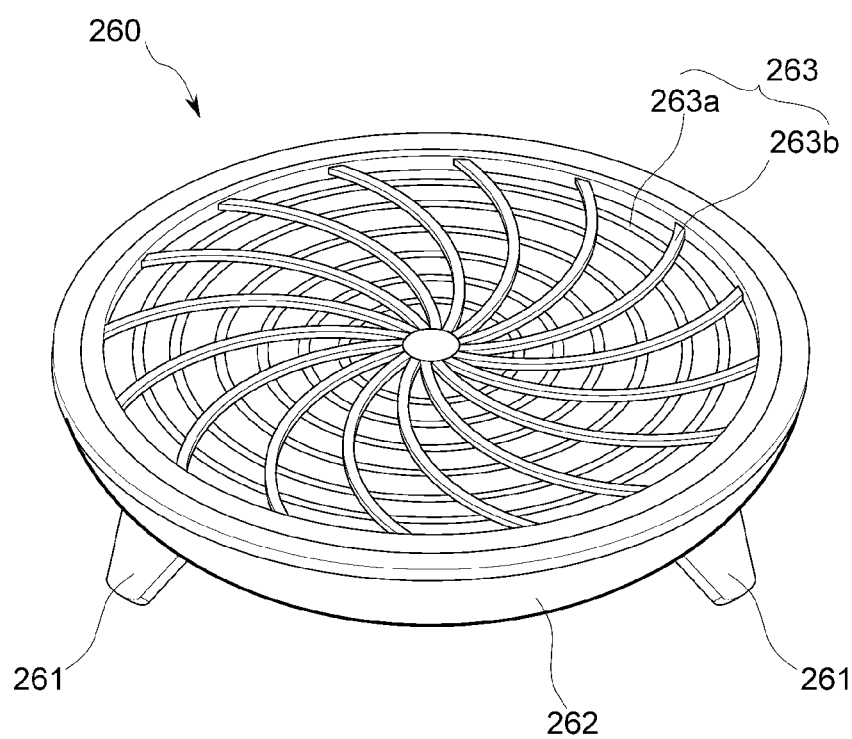
FIG. 4 is a view illustrating a convection plate in an example embodiment according to the present disclosure.
Figure 5:
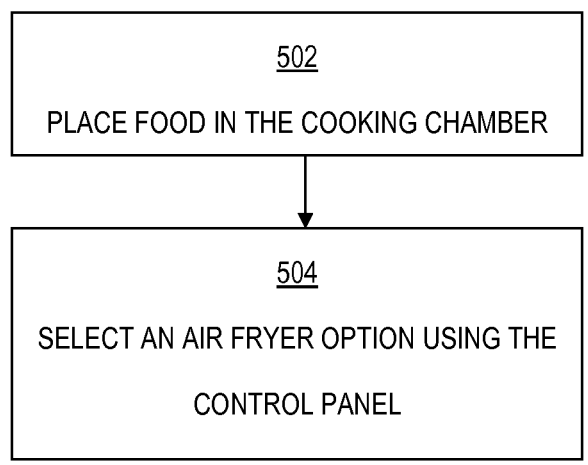
FIG. 5 is a flowchart of an example of a method for using an over-the-range microwave oven in an embodiment according to the present disclosure.

FIG. 4 is a view illustrating the convection plate in an example embodiment according to the present disclosure.

Referring to FIG. 4, the convection plate 260 may include a supporting portion 261 which is supported on the bottom of the cooking chamber 210, a concave portion 262 which is supported by the supporting portion 261 and opens upward, and a convection portion 263 which is disposed on the concave portion 262 so as to support food and allow air flowing into the concave portion 262 to flow upward clockwise or counterclockwise.

The supporting portion 261 may be implemented as at least three legs disposed on a lower surface of the concave portion 262, and the legs may be disposed and securely supported in a circular recess 215 formed in the microwave oven.

In addition, the supporting portion 261 may be detachably disposed on the concave portion 262 which will be described below, or may be formed integrally with the concave portion 262.

A reflective plate is disposed on an upper surface of the concave portion 262, which faces the convection portion 263, thereby better implementing the air fryer function. The reflective plate is formed as a ceramic coated layer, thereby more effectively frying or cooking food and/or food ingredients by generating far-infrared rays.

In addition, a venting hole (not illustrated) may be formed at the center at a lower side of the concave portion 262, such that hot air flows into the concave portion 262 through the venting hole and is discharged through the convection portion 263 which will be described below, thereby effectively heating food.

The convection portion 263 may include a plurality of circular and concentric supporting ribs 263a, which have diameters that increase in the direction away from the center toward the outside, and a plurality of cross ribs 263b which have one end connected to the center and the other end connected to the supporting rib disposed at the outermost side away from the center, and is coupled to the plurality of supporting ribs where they intersect the plurality of supporting ribs.

In an embodiment, the plurality of cross ribs 263b each have the same curvature and curve in the same direction, and are disposed at equal intervals, such that hot air, which flows from the interior of the concave portion 262 in a direction toward food, flows in a circular direction (like a tornado twirls), thereby more effectively frying or cooking food.

In addition, although not illustrated, a cover, which may be disposed over the convection portion 263, may be further provided. The cover may be formed in a dome shape, trapping heat and thereby shortening the time required to heat the food disposed on the convection portion 263 and uniformly heating the food.

A method 500 of using the over-the-range microwave oven, which functions as an air fryer, in an example embodiment according to the present disclosure will be described below.

The method of using the over-the-range microwave oven, which functions as an air fryer, in an example embodiment according to the present disclosure, includes placing food in the cooking chamber 210 (block 502), and selecting an air fryer option using the control panel 221 (block 504); the sequence of these two steps may be different.

The placing of the food may be performed by a series of actions in which the door 211 is opened, the convection plate 260 is disposed in the cooking chamber 210, the food is placed on the convection plate 260, and the door 211 is closed.

The selecting of the air fryer option may further include setting a cooking time. In order to implement the air fryer function, only the heater unit 250 may be operated, or the heater unit 250 may be operated together with the magnetron.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An over-the-range microwave oven comprising:
   a housing;
   an electric equipment chamber which is disposed in the housing, and includes a control panel and a drive unit;
   a cooking chamber which is disposed in the housing and is controlled by the electric equipment chamber, and has an air inlet portion which is disposed at one side of the cooking chamber and into which outside air flows, and an opening and closing unit which is disposed at the other side of the cooking chamber, opposite the one side, that is opened and closed based on a flow rate of flowing air;
   a heater unit which is disposed in a chamber selected from the group consisting of the electric equipment chamber and the cooking chamber; and
   a duct unit in the housing and disposed outside the cooking chamber, wherein the opening and closing unit includes a discharge hole which is formed in a wall at the other side of the cooking chamber, and an opening and closing plate which is hingedly coupled outside the wall.

2. The over-the-range microwave oven of claim 1, wherein the opening and closing plate is disposed above the discharge hole and closes the discharge hole using its own weight.

3. The over-the-range microwave oven of claim 1, wherein the opening and closing plate is disposed at a lateral side of the discharge hole, and a flat spring is disposed at a position where the opening and closing plate is hingedly coupled, such that the discharge hole is closed by the restoring force of the flat spring.

4. The over-the-range microwave oven of claim 1, wherein a motor is disposed at a position where the opening and closing plate is hingedly coupled, such that the opening and closing plate opens and closes the discharge hole by operation of the motor.

5. The over-the-range microwave oven of claim 1, wherein the heater unit includes an electric heater which is disposed in the electric equipment chamber to correspond to the air inlet portion, and a fan which is disposed at the rear of the electric heater and allows air heated by the electric heater to flow to the air inlet portion.

6. The over-the-range microwave oven of claim 1, wherein the heater unit includes a halogen lamp which is disposed on a surface selected from the group consisting of an upper surface of the cooking chamber, and a lateral side surface of the cooking chamber.

7. The over-the-range microwave oven of claim 6, wherein two or more halogen lamps are disposed on the upper surface of the cooking chamber.

8. The over-the-range microwave oven of claim 6, wherein two or more halogen lamps are disposed on one side surface or both lateral side surfaces of the cooking chamber.

9. The over-the-range microwave oven of claim 1, further comprising:
   a convection plate which is disposed on a food accommodating portion at the bottom of the cooking chamber and allows hot air flowing from the air inlet portion to flow upward.

10. The over-the-range microwave oven of claim 9, wherein the convection plate includes:
    a supporting portion which is supported on the bottom of the cooking chamber;
    a concave portion which is supported by the supporting portion and is opened upward; and
    a convection portion which is disposed on the concave portion so as to support food and that allows air flowing into the concave portion to flow upward.

11. The over-the-range microwave oven of claim 10, wherein a reflective plate is disposed on an upper surface of the concave portion which faces the convection portion.

12. The over-the-range microwave oven of claim 11, wherein the reflective plate comprises a ceramic coated layer.

13. The over-the-range microwave oven of claim 10, wherein the convection portion includes a plurality of circular and concentric supporting ribs and a plurality of cross ribs which have one end connected at the center of the convection portion and the other end connected to the outermost supporting rib and are coupled to the plurality of supporting ribs.

14. The over-the-range microwave oven of claim 13, wherein the plurality of cross ribs each curve in the same direction, and are disposed at equal intervals.

* * * * *